Figure 1:
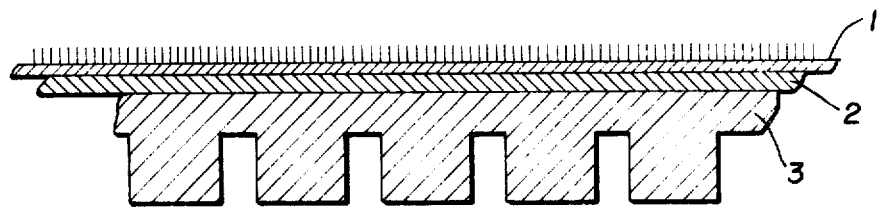

United States Patent [19]
Baxter et al.

[11] 3,887,737
[45] June 3, 1975

[54] LAMINATE WITH FLOCKED FIBER PILE

[75] Inventors: Samuel Paul Baxter, London, England; Keith Marchant, Newport, Wales

[73] Assignee: Monsanto Chemicals Limited, London, England

[22] Filed: June 27, 1972

[21] Appl. No.: 266,844

[52] U.S. Cl. .................................. 428/90; 428/95
[51] Int. Cl. ........................................ D04h 11/00
[58] Field of Search ............... 161/62, 64, 67, 159; 117/26

[56] References Cited
UNITED STATES PATENTS

| | | | |
|---|---|---|---|
| 2,567,951 | 9/1951 | Lewis | 161/64 |
| 3,166,455 | 1/1965 | Levitch | 161/64 |
| 3,496,054 | 2/1970 | Baigas | 161/63 |
| 3,518,102 | 6/1970 | Mertgen | 161/67 |
| 3,565,742 | 2/1971 | Stephens | 161/64 |
| 3,591,401 | 7/1971 | Snyder | 161/64 |
| 3,600,261 | 8/1971 | Kerres | 161/64 |
| 3,661,674 | 5/1972 | Higgs | 161/159 |
| 3,772,131 | 11/1973 | Triplett | 161/67 |

Primary Examiner—Marion E. McCamish
Attorney, Agent, or Firm—Russell E. Weinkauf

[57] ABSTRACT

The invention comprises a laminate in which one face of a fabric sheet bears a pile of flocked fibers and the opposing face is bonded to a sheet of a foamed polyolefin resin. The laminates are useful as surface covering materials; e.g., carpets, upholstery and wallcoverings.

5 Claims, 2 Drawing Figures

LAMINATE WITH FLOCKED FIBER PILE

BACKGROUND OF THE INVENTION

This invention relates generally to a pile-bearing laminate which can be used as wall-covering, upholstery, carpeting and in other surface covering applications. More particularly, the invention is directed to a laminate in which one face of a fabric sheet bears a pile of flocked fibers and the other is bonded to a sheet of a foamed polyolefin resin.

The polyolefin resin foam to which the fabric sheet is bonded can be for example a polyethylene or a polypropylene foam or a copolymer of an olefin with a copolymerisable monomer such as for example a vinyl ester of a fatty acid such as vinyl acetate. The preferred foams are however made from polyethylene (made by either low pressure or high pressure processes) and particularly polypropylene. Where the foam is made from polyethylene or polypropylene the resin can have a melt index of from 0.1 to 10 and preferably from 1 to 5. It is often advantageous to use a polypropylene that has been plasticised with a plasticiser such as for example a chlorinated wax, a chlorinated biphenyl such as "Aroclor 1242," (Aroclor is a Registered Trade Mark), or an ester plasticiser such as for instance a mixture of nonyl esters of $C_4$ to $C_6$ dibasic acids sold under the trade mark "Pliabrac 987," in amounts that can be from 1 to 30%, and especially from 5 to 15% by weight of the resin. When the foam is made from such a plasticised polypropylene resin the preferred plasticiser is an ester plasticiser such as "Pliabrac 987."

The foam can be open cell or closed cell but it is usually desirable that a closed cell foam be used. The average cell size in such foams can for instance be anything from 0.05 to 2 mm such as for example from 0.1 to 0.5 mm. Preferred foams have an average cell size of from 0.2 to 0.4 mm. The density of the foam can vary widely between for example from 5 to 100 kilograms per cubic meter such as from 10 to 80 and especially 20 to 50 kilograms per cubic meter, though the density chosen in practice will depend on the use to which the material is to be put.

Where the pile-bearing material is intended for use as a carpet it is desirable that the foam have an evenly progressive resistance to deformation, that is to say it should neither have a high resistance at low stresses followed by failure of the structure when subjected to high pressures, nor a low resistance at low stresses followed by an exceptionally high resistance, indicating virtual incompressibility beyond a certain level, at high stresses. In practical terms, the preferred foam sheet is one in which a 20% reduction in thickness is obtained by a stress of from 0.5 to 10 p.s.i. and a 70% reduction of thickness is obtained by a stress of from 15 to 40 p.s.i.

It is also advantageous if the foam layer be resilient, that is, that it should have the ability to regain its shape after deformation. It has been found that particularly suitable foams are those which after compression at 20 p.s.i. for 24 hours recovered at least 50% and preferably at least 60% of their original thickness within 100 hours from the removal of the load.

Another feature which depends largely on the end use to which the pile-bearing material is to be put is the thickness of foam sheet. In practical terms however the foam can for example be from 1.5 to 25 mm and preferably from 3 to 20 mm with a thickness of from 6 to 12 mm being suitable for most end uses. While it is preferable that the surface of the foam which is to be adhered to the fabric sheet be planar, it is very often preferred that the opposed surface of the foam have a relief pattern imposed upon it. The pattern can be for example a corrugated, pimpled or waffle pattern. In preferred foamed sheets the surface has a square waffle pattern which can penetrate to a depth of from 10 to 70 and preferably from 30 to 60% of the thickness of the foam sheet. FIG. 1 of the drawings illustrates a preferred pile fabric in which a waffle pattern has been applied to the foam.

The fabric sheet can be made from natural or man-made fiber such as for example a vegetable fiber such as cotton or jute, or a keratinous fiber such as wool; an artificial cellulosic fiber such as viscose or a cellulose ester; or a fiber-forming synthetic polymer or copolymer derived from a monomer such as a nitrile, an ester or an olefin. The fabric sheet can be woven or non-woven with the latter the more preferred construction.

Suitable non-woven fabrics can be made from staple fibers, in which case they can be air-blown webs, consolidated batts, needle felts and the like. It is also possible to use fibrillous sheets produced by stretching a sheet of a foamed thermoplastic polymer such as for example a polyolefin. Alternatively and more preferably they can comprise continuous filaments deposited in random fashion on a receiving surface and consolidated to form a self-supporting sheet of material. Such preferred non-woven fabrics are normally confined to synthetic fibers and among those found most advantageous are fibers formed from polymers of acrylonitrile, olefins and amides, particularly polyamide fibers such as nylon 6, 6 fibers. A non-woven fabric that is found particularly suitable for use as the fabric sheet in the present invention is the non-woven fabric made from continuous nylon filaments and available under the registered trade mark Cerex. The thickness of the fabric sheet can for example be anything from 0.1 to 0.4 mm and particularly from 0.1 to 0.2 mm. In practice this will mean that the fabric sheet preferably has a weight per square yard of from 0.5 to 4 oz/sq.yd. with weights per square yard of from 1.0 to 2 ounces being especially appropriate with the preferred sheets used in the invention.

Figure 2:
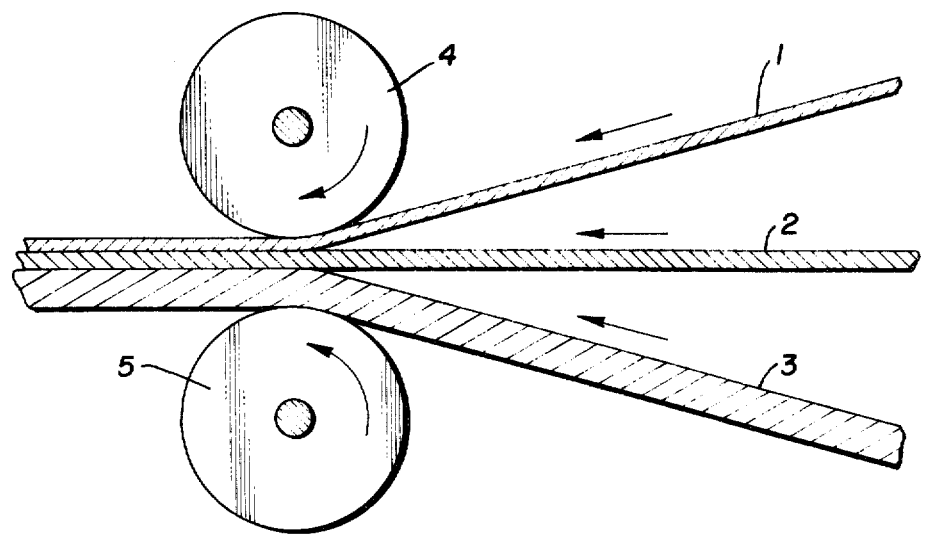

The bonding of the fabric sheet to the foam can be achieved in a variety of ways. It is possible for example to use any suitable adhesive but it is often better to melt a thin film of an olefin polymer or copolymer such as polyethylene or an ethylene/vinyl acetate copolymer, between the fabric sheet and the foam while the two are pressed together. A suitable means of carrying out this latter method of achieving bonding is illustrated in FIG. 2 of the drawings which shows a sandwich structure comprising an upper layer, 1, of a fabric sheet, a central layer, 2, of an ethylene/vinyl acetate copolymer film and a lower layer, 3, of a polyolefin foam fed through the nip of a pair of rolls, 4 and 5, the upper one of the pair, 4, being heated above the softening point of the ethylene/vinyl acetate copolymer film.

An alternative means of bringing about bonding between the fabric sheet and the foam is by contacting the sheet with the foamed polymer while the polymer is in a softened condition.

The sheet of foamed resin can for example be one that has been produced by an extrusion process, in which a heat-softened foamable resin composition is extruded under pressure through a die into a zone of lower pressure where foaming of the resin takes place. A foamable resin composition requires the presence of a blowing agent, and this is preferably a normally gaseous substance although it can be a volatile liquid. In many cases the blowing agent is one that is normally gaseous but which while under pressure before extrusion is present in the liquid state. Examples of volatile substances that can be used include lower aliphatic hydrocarbons, such as ethane, propane, a butane or butene, or a pentane or pentene; lower alkyl halides, such as methyl chloride, trichloromethane, dichlorodifluoromethane, or 1,2-dichlorotetrafluoroethane; and inorganic gases such as carbon dioxide or nitrogen. The lower aliphatic hydrocarbons, especially a butane, or mixtures of butanes are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. Where the polyolefin is polypropylene it is preferred that the blowing agent be butane. From 3 to 30%, especially 7 to 20%, by weight based on the weight of the resin is often a suitable proportion of blowing agent, and for example the use of from 15 to 25% by weight of butane in conjunction with polypropylene has given excellent results.

Preferably the foamable resin composition contains a nucleating agent, which assists in the formation of a large number of small cells. A wide range of nucleating agents can be employed, including finely divided inert solids, such as for example silica or alumina, preferably in conjunction with zinc stearate, or small quantities of a substance that decomposes at the extrusion temperature to give a gas. An example of the latter class of nucleating agents is sodium bicarbonate, used if desired in conjunction with a weak acid such as for example tartaric acid or citric acid. The calcium salts of carboxylic acids such as for example calcium acetate or calcium benzoate have also proved effective. A small proportion of the nucleating agent, for example up to 5% by weight of the resin is usually effective. The surface of the foam can often be improved for the purpose of this invention by arranging that the resin be extruded between cooled forming lips so as to form a smooth unfoamed or substantially unfoamed skin on its surface.

The fibers constituting the flock can be any suitable natural or synthetic fiber and be selected for example from any of the fibers listed above as suitable materials for the production of the fabric sheet. The preferred fibers are formed from acrylonitrile polymers particularly acrylic fibers sold under the registered trade mark "Acrilan." The denier of the fibers can be anything up to 70 denier for example from 5 to 30 and preferably from 10 to 20 denier. The length of the fibers can for example be as much as 20 mm but they are more conveniently up to 10 and preferably from 1 to 6 mm long.

Either precision-cut or random-cut flock can be used in the process of the invention, that is to say the flock can be either cut to exact lengths from a bundle of parallel crimp-free filaments (precision-cut) or it can be a mass of extremely short fibers of varying lengths (random-cut). Of these the former is preferred.

The fibers are conveniently flocked on to a fabric that is already bonded to the foamed polyolefin sheet but alternatively, and often less preferably, the flocking operation can take place before or even during the bonding of the fabric to the foamed polyolefin sheet.

Flocking the fibers on to the fabric sheet can be achieved by any suitable electrostatic or mechanical means. Generally whatever the means, the process comprises depositing a mass of finely cut fibers onto the fabric sheet and causing them to adhere thereto. The main types of suitable flocking process include (1) a mechanical process comprising spraying the fibers on to an adhesive-coated substrate, (2) a further mechanical process comprising sifting the fibers on to an adhesive-coated substrate and vibrating the substrate by the action of beater-bars to cause the fibers to stand erect and penetrate the adhesive, and (3) an electrostatic process in which the lines of force of an electrostatic field are used to propel and guide the fibers from a hopper to an adhesive-coated substrate, and (4) a combination of electrostatic and mechanical processes.

Of these the preferred process is a combination of an electrostatic and mechanical processes in which an electrostatic flocking machine such as an "Arno H. Wirth", "Eloflock" or "Aerostyle" machine is used in combination with mechanical beater bars.

The fibers are made to adhere to the fabric sheet by the use of an adhesive, and this is normally coated on to the fabric sheet prior to the flocking process. Many suitable adhesives are available, for example, those based on polyesters, particularly isocyanate-modified polyesters, or pure polyesters, in organic solvents, cross-linked with polyfunctional isocyanates; synthetic latex polymers such as self-cross-linking acrylics; and plastisols, especially those based on polyvinyl chloride.

Usually the adhesive is applied in a layer which need not for instance be thicker than 0.1 inch and is preferably between 0.001 inch and 0.1 inch, such as for example 0.01 inch.

The weight of adhesive actually applied should be sufficient to give adequate adhesion without matting the pile. In practice an application of from 1 to 10 and particularly from 4 to 8 oz/square yard (measured dry) is found to be satisfactory.

The novel materials of the invention can for instance be used as carpets, upholstery materials, wall-coverings and in cloths. The fibers can of course be coloured or printed by conventional techniques.

The invention is illustrated by the following Example.

EXAMPLE

A foamed polypropylene sheet was extruded using a 2½ inch Fawcett Preston extruder with a 430 mm. slit die and a die gap of 15 thousandths of an inch. The polymer melt index was 1.5 and an isobutylene blowing agent used in conjunction with 1 p.h.r. of talc as nucleating agent. The density of the foam was 32 kgm/cubic meter and width and thickness dimensions were 430 mm and 9.7 mm respectively.

The foam was formed into a square waffle pattern using a 3½ inch O.D. appropriately patterned steel roller.

The foam was bonded to a non-woven nylon filament fabric to give a fabric/foam laminate with a weight of 1 oz/square yard, using a ethylene/vinyl acetate copolymer film of thickness 2 thousandths of an inch. The bonding was accomplished by passing the foam and non-woven fabric separated by the ethylene/vinyl acetate copolymer film between the nip of a pair of rollers. The roller contacting the non-woven fabric was heated to a temperature sufficient to melt the polyethylene film. The nip gap was ¼ inch and the rollers were driven at such a rate as to give a throughput of 5½ feet/minute.

The exposed surface of the non-woven nylon filament fabric was coated with an acrylic emulsion adhesive comprising 80 parts of a self-cross-linking acrylic emulsion sold under the trade name "HA8 Primal;" 20 parts of a hydroxypropylmethyl cellulose thickening agent; and 1 part of a solution of 10% oxalic acid in water. The adhesive was applied using a "knife-over-roller" technique and the resultant dry weight of adhesive applied was 4 ounces/square yard. The coated fabric/foam laminate thus produced was passed through an Aerostyle electrostatic flocking machine modified by the addition of beater bars to aid in obtaining an even deposition of fibers on the adhesive bearing face.

The flocking fibers were of "Acrilan" acrylic fiber and were 2½ mm in length and 15 denier. The flock coverage was 10 ounces/square yard.

After removal of surplus flock, the product was dried in a forced draught oven for 1 hour at 110° C. This also had the effect of cross-linking the adhesive.

When the foam used in the floor covering was tested for compressibility at a rate of increase of compression of 0.5 inch/minute it was found that 20% compression was reached at 3-4 p.s.i., 40% at 8-11 p.s.i., 60% at 16-20 p.s.i., and 70% at 22-29 p.s.i.

A number of four inch square pieces of the foam were tested for recovery after compression. It was found that samples compressed at 20 p.s.i., for a period of 24 hours and then left at room temperature for a period of 100 hours recovered well over half of their original thickness.

The product obtained was very suitable for use as a floor covering.

What we claim is:

1. A laminar structure for use as a surface covering comprising: a non-woven fabric sheet of continuous filaments wherein said sheet has a thickness of from 0.1 to 0.4 mm and a weight of 0.5 to 4 ounces per square yard, a pile of flocked fibers secured to one face of said fabric sheet by an adhesive, a foamed sheet of polyolefin resin selected from the group consisting of polyethylene and polypropylene resins bonded to the face of said fabric sheet opposite to that on which said flocked fibers are secured.

2. The laminar structure according to claim 1, wherein said non-woven fabric sheet is one formed by depositing continuous filaments in random fashion on a receiving surface and consolidating them to form a self-supporting sheet of material.

3. The laminar structure according to claim 2, wherein said continuous filaments are nylon.

4. The laminar structure in accordance with claim 1 in which the denier of the flocked fibers is from 5 to 30 and the flock coverage is from 5 to 15 ounces per square yard.

5. The laminar structure in accordance with claim 1 in which the fabric sheet is bonded to the foam sheet by a film of an olefin polymer interposed between the sheets and fused to both.

* * * * *